(12) United States Patent
Huang et al.

(10) Patent No.: US 8,609,217 B2
(45) Date of Patent: Dec. 17, 2013

(54) OPTICAL RECORDING MEDIA WITH SPECIFIC VISION LABEL LAYER

(71) Applicant: CMC Magnetics Corporation, Taipei (TW)

(72) Inventors: Ying-Yen Huang, Taipei (TW); Yung-Hui Hung, Taipei (TW); Cheng-Pi Lee, Taipei (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 13/690,356

(22) Filed: Nov. 30, 2012

(65) Prior Publication Data

US 2013/0142968 A1    Jun. 6, 2013

(30) Foreign Application Priority Data

Dec. 2, 2011  (TW) .............................. 100144352 A

(51) Int. Cl.
*G11B 7/24*    (2013.01)

(52) U.S. Cl.
USPC ..................... 428/64.1; 428/64.4; 430/270.11

(58) Field of Classification Search
USPC ..................................... 428/64.4; 430/270.11
See application file for complete search history.

(56) References Cited

U.S. PATENT DOCUMENTS

| | | | | |
|---|---|---|---|---|
| 6,287,661 | B1 * | 9/2001 | Shigetomi et al. | 428/64.7 |
| 8,018,822 | B2 * | 9/2011 | Otsu et al. | 369/275.1 |
| 2008/0291815 | A1 * | 11/2008 | Edwards | 369/283 |

* cited by examiner

*Primary Examiner* — Elizabeth Mulvaney
(74) *Attorney, Agent, or Firm* — Roger G. J. Chen

(57) ABSTRACT

An optical recording medium is equipped with a light transmitting layer to have visual effects. Patterns with different visual effects can be printed on the upper and low surfaces of the light transmitting layer. Alternatively, visual effects can be presented by directing light out of an upper light grating from a low printing layer. The optical recording medium can not only record information but also present visual effects.

11 Claims, 3 Drawing Sheets

OPTICAL RECORDING MEDIA WITH SPECIFIC VISION LABEL LAYER

CROSS-REFERENCE TO RELATED APPLICATION

This application claims priority from Taiwan Patent Application No. 100144352 filed on Dec. 2, 2011, which is hereby incorporated herein by reference in its entirety.

BACKGROUND OF THE INVENTION

1. Field of the Invention

The invention relates to optical recording media, and particularly, to a substrate structure and a printing design of optical recording media.

2. Description of Related Art

Optical recording media can be generally divided into two types, namely, a write once medium and a rewritable medium through being irradiated a laser beam. With regard to the write once medium, its recording layer includes an organic dye, and a reflective layer and a protection layer are sequentially formed on a transparent substrate. So, it is also named as an organic dye type optical recording medium. For example, R.O.C Patent Publication No. 577069 just discloses such an organic dye type optical recording medium. Furthermore, an inorganic material such as metal and metalloids can be used to replace the organic dye as the recording layer, and a rewritable medium is obtained. For example, R.O.C Patent Publication No. 1328226 discloses a phase change type optical recording medium in this regard.

The blu-ray disk has been gradually promoted to a worldwide market. However, it is still a standard format product (Basic Format Specification Version 1.* & 2.*) up to date. Its standard structure comprises a single disc substrate and a stacked film layer, as shown in FIG. 1. The printing layer on its surface is a single film layer, and hence, cannot show three-dimensionally or specially visual effects. R.O.C. Patent publication No. 200737179 further discloses a disk with patents, as shown in FIG. 2. The prior art uses a metal template (20) formed by the LIGA-like method of MEMS (Micro Electro Mechanical Systems) as a mold for forming a disk so that the disk can have patterns thereon. Particularly, the patterns look very fine and far beyond ones printed by conventional inks. It is worthy to note that the template has a three-dimensionally uneven surface, and hence the disk formed through injection by using the mold is different from the conventional disk with a flat surface. Furthermore, according to the requirements of various products, a required pattern such as a security mark is made on the disk when the patterned disk is fabricated.

However, the injection mold for the foregoing patterned disk has a seed layer (16) and a metal layer (18) which are necessarily formed by the MEMS LIGA-like and photo mask technologies. Thus, the complicated exposure and etching processes for the two layers incur a higher manufacturing cost. The manufacturers are hard to introduce such three-dimensional patents into the optical recording media whose selling prices have quickly dropped because of the higher manufacturing cost. Moreover, the optical recording media cannot be further promoted without any changes. In view of above, the applicants of the present application try to find a method for improving the conventional optical recording media the around the clock. Thereafter, the present invention is completed, and the details are described below.

SUMMARY OF THE INVENTION

In order to achieve the visual effects of the foregoing three-dimensional appearance, the present invention utilizes the combination of a disc substrate and a light transmitting layer and interposes a low printing layer between the disc substrate and the light transmitting layer. Through the optical grating of the light transmitting layer or the combination of the low printing layer and an upper printing layer in design, the low printing layer can show variously visual effects. For example, an upper printing layer printed on the upper surface of the light transmitting layer can make the upper and low printing layers to show patterned effects on gradation and combination. Or, an optical grating structure is formed on the light transmitting layer by injection or dispensation, and cooperates with the patterns of the low printing layer to achieve the three-dimensional effect on the patterns.

DETAILED DESCRIPTION OF THE INVENTION

The present invention discloses an optical recording medium showing the visual effects of patterns using a special structure design. The optical recording medium of the present invention has specially patterned effects, and data also can be steadily written into it and be stored for long term. These embodiments just illustrate the preferred ones of the present invention, but it is not to be construed as being limited by them.

Figure 1:
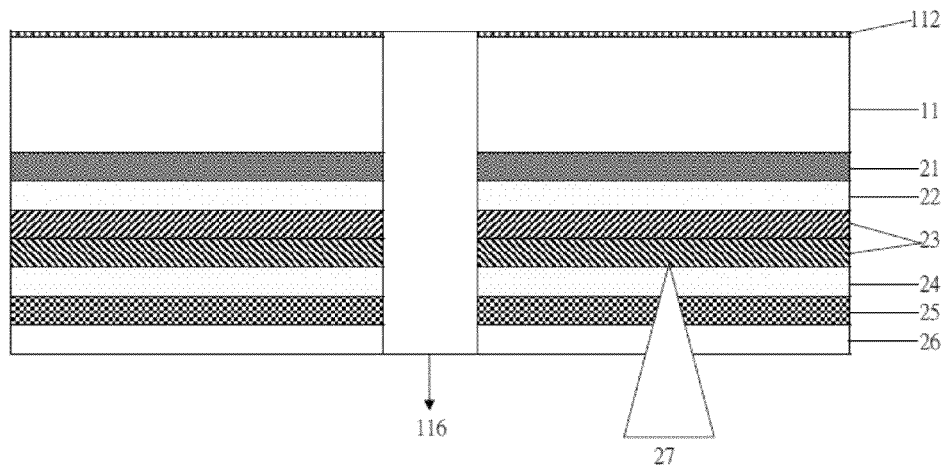
FIG. 1 is a structure diagram of a convention optical recording medium.
Figure 2:
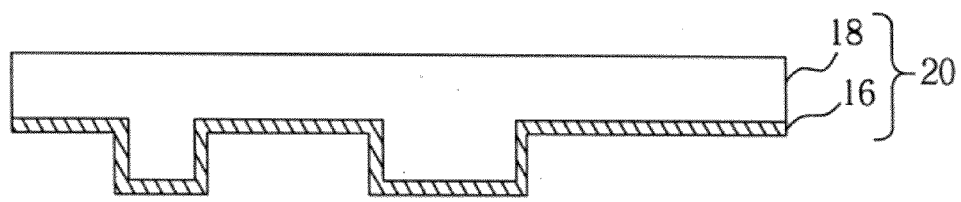
FIG. 2 is a structure diagram of a conventionally improved optical recording medium.
Figure 3:
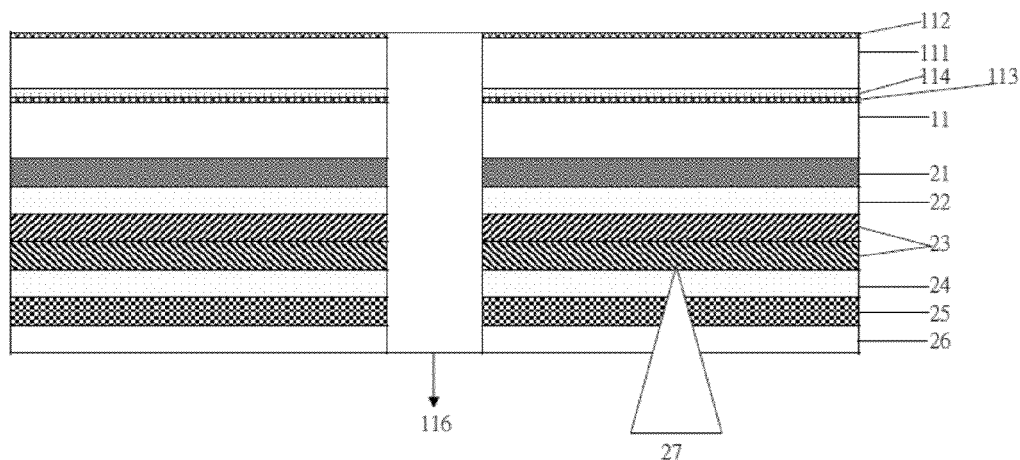
FIG. 3 is a schematic diagram of the structure of an optical recording medium in accordance with the first embodiment of the present invention.

As shown in FIG. 3, the present invention is an optical recording medium with a specific vision label layer, comprising a substrate on which a recording layer is disposed for storing optical information; a light transmitting layer formed on another side of the substrate, wherein a low printing layer is interposed between the substrate and the light transmitting layer, and a transparent upper printing layer or a light grating structure is formed on the light transmitting layer, wherein light reaching the low printing layer and the upper printing layer or the light grating structure has various optical path lengths or a diffractive effect so that patterns on at least one of the printing layers are refracted and changed in depth of filed or other optical characteristics. From different view angels, a viewer can see the variation of a stacked pattern image.

The present first embodiment relates to a phase change type optical recording medium, and the structure of it is shown in FIG. 3. The optical recording medium comprises: a substrate (11) is transparent and has spiral and continuous grooves thereon; a reflective layer (21) is disposed on a surface of the substrate (11) for reflecting laser light; a upper dielectric layer (22) is disposed on the reflective layer (21); a recording layer (23) is disposed on the upper dielectric layer (22) for receiving the laser light to write data thereon; a low dielectric layer (24) is disposed on the recording layer (23); a buffer layer (25) is disposed on the low dielectric layer (24); a covering layer (26) is disposed on the buffer layer (25); a low printing layer (113) on which a first pattern is printed is disposed on another surface of the substrate (11); a light transmitting layer (111) is adhered to the low printing layer (113) by an adhesive layer (114); an upper printing layer (112) on which a second pattern is printed is disposed on the light transmitting layer (111); the variation of the optical path length of light transmitted in the light transmitting layer (111) causes the first pattern and the second pattern to change in the depth of filed so that the first pattern on the upper printing layer (112) and the second pattern on the low printing layer (113) have special visual effects.

Figure 4:
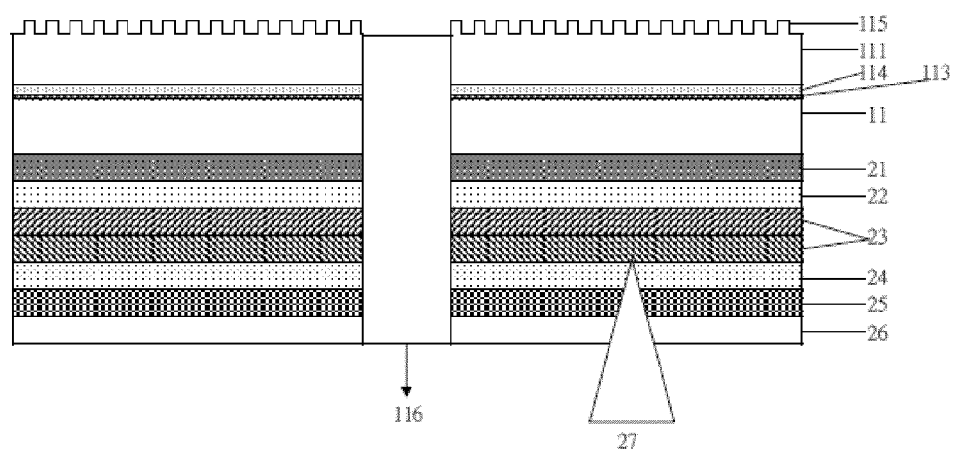
FIG. 4 is a schematic diagram of the structure of an optical recording medium in accordance with the second embodiment of the present invention.

The present second embodiment relates to a phase change type optical recording medium, and the structure of it is shown in FIG. 4. The optical recording medium comprises: a substrate (11) is transparent and has spiral and continuous grooves thereon; a reflective layer (21) is disposed on a surface of the substrate (11) for reflecting laser light; a upper dielectric layer (22) is disposed on the reflective layer (21); a recording layer (23) is disposed on the upper dielectric layer (22) for receiving the laser light to write data thereon; a low dielectric layer (24) is disposed on the recording layer (23); a buffer layer (25); a covering layer (26); a low printing layer (113) on which a pattern is printed is disposed on another surface of the substrate (11); a light transmitting layer (111) having a light grating (115) is adhered to the low printing layer (113) by an adhesive layer (114); the light grating (115) causes light refraction to make the pattern present parallax and a three-dimensional image or a changeable image, wherein the grooves on the light grating (115) can be formed by mold injection, engraving or film coating.

In the structures of the first embodiment and second embodiment, the material of the light transmitting layer (111) is a transparent material and provides proper mechanical strength for the optical recording medium. The material may be polycarbonate resin, polymethyl methacrylate, polystyrene resin, polyethylene resin, or polypropylene resin.

Figure 5:
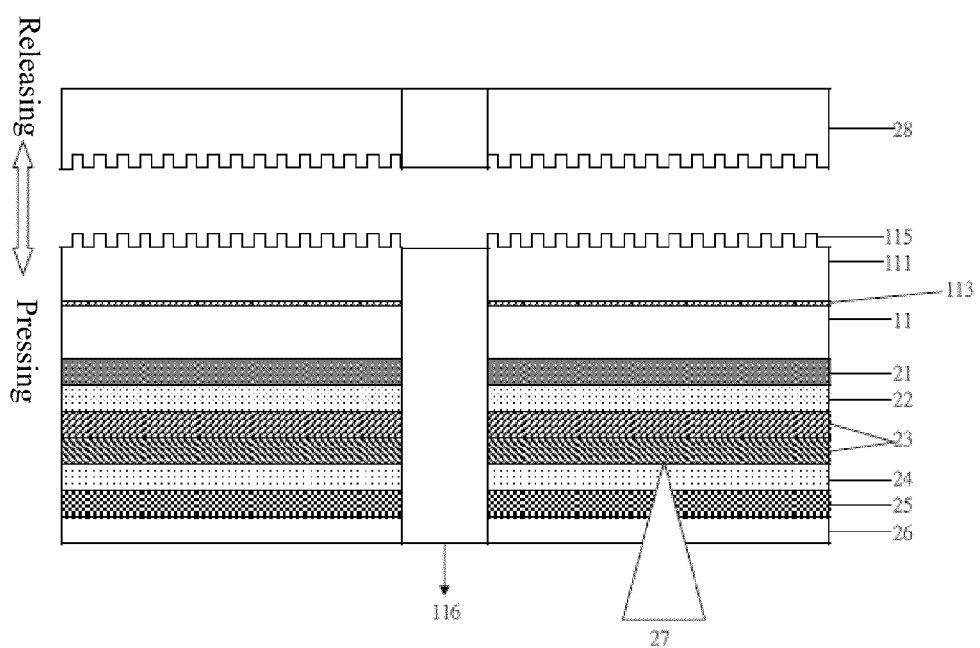
FIG. 5 is a schematic diagram of the structure of an optical recording medium in accordance with the third embodiment of the present invention.

As shown in FIG. 5, the present third embodiment of an optical recording medium utilizes a film coating method to form a grating structure. After a low printing layer (113) with a first pattern is printed on another surface of the substrate (11) in advance, UV hardening resin (1111) is disposed between the low printing layer (113) and a reproducing female mold (28). The reproducing female mold (28) has light grating structure. By pressing and spin coating, the light grating structure of the reproducing female mold (28) is molded. Thereafter, a UV radiation apparatus (29) radiates light to the UV hardening resin (1111) for hardening the molded light grating, and hence, a light transmitting layer (111) with the light grating structure is formed. After the reproducing female mold (28) is taken off, the optical recording medium with the light grating structure is obtained and its pattern presents a three-dimensional visual effect.

In the structure of the third embodiment, the UV hardening resin having protection and light-grating reproducing functions is used to form the light transmitting layer (111) instead of the adhesive process of the second embodiment for adhering it to the low printing layer (113). Therefore, the processes of the third embodiment can resolve the problem of unexpected low yields caused by the adhesive process. The material of the UV hardening resin may be a material which ensures the stability of the low printing layer and provides the three-dimensional visual effects.

The foregoing embodiments of the invention have been presented for the purpose of illustration. Although the invention has been described by certain preceding examples, it is not to be construed as being limited by them. They are not intended to be exhaustive, or to limit the scope of the invention. Modifications, improvements and variations within the scope of the invention are possible in light of this disclosure.

What is claimed is:

1. An optical recording medium with a specific vision label layer, comprising:
    a substrate having a surface on which at least one recoding layer is disposed for storing optical information;
    a light transmitting layer formed on another surface of the substrate, wherein a light grating structure is on another surface of the light transmitting layer opposite the substrate, the light grating structure is formed by disposing the light transmitting layer on a reproducing female mold having the light grating structure, pressing the structure against the reproducing female mold for molding the light transmitting layer through the reproducing female mold; and
    a low printing layer on which a pattern is printed disposed between the substrate and the lighting transmitting layer.

2. The optical recording medium with a specific vision label layer according to claim 1, wherein an upper printing layer is disposed on the light transmitting layer.

3. The optical recording medium with a specific vision label layer according to claim 2, wherein light reaching the low printing layer and the upper printing layer has different optical path lengths in the light transmitting layer to cause refraction and depth of filed so that a change in an optical image occurs in different view angles to the printing layers.

4. The optical recording medium with a specific vision label layer according to claim 1, wherein light reaching the low printing layer and the light grating structure of the light transmitting layer causes diffraction so that a change in an optical image occurs in different view angels to the low printing layer.

5. The optical recording medium with a specific vision label layer according to claim 1, wherein the material of the light transmitting layer is selected from the group consisting of polycarbonate resin, polymethyl methacrylate, polystyrene resin, polyethylene resin, polypropylene resin and UV hardening resin.

6. The optical recording medium with a specific vision label layer according to claim 1, wherein the recording layer pertains to a phase change type or an organic dye type.

7. A method of manufacturing a light transmitting layer with a light grating structure, comprising:
    printing a low printing layer with patterns on a surface of a substrate;
    disposing UV hardening resin between the low printing layer and a reproducing female mold, wherein the reproducing female mold has a light grating structure;
    pressing the substrate against the reproducing female mold for molding the light grating structure through the reproducing female mold;
    radiating light to the UV hardening resin for hardening the mold light grating structure to form a light transmitting layer with the light grating structure through a UV radiation apparatus; and
    releasing the reproducing female mold.

8. An optical recording medium with a specific vision label layer, comprising:
    a substrate having a surface on which at least one recording layer is disposed for storing optical information;
    a light transmitting layer manufactured by the method of claim 7, the light transmitting layer formed on another surface of the substrate.

9. The optical recording medium with a specific vision label layer according to claim 8, wherein light reaching the low printing layer and the light grating structure of the light transmitting layer detracts so that a change in an optical image occurs in different view angels to the low printing layer.

10. The optical recording medium with a specific vision label layer according to claim 8, wherein the material of the light transmitting layer is selected from the group consisting of polycarbonate resin, polymethyl methacrylate, polystyrene resin, polyethylene resin, polypropylene resin and UV hardening resin.

11. The optical recording medium with a specific vision label layer according to claim 1, wherein the recording layer pertains to a phase change type or an organic dye type.

\* \* \* \* \*